Dec. 21, 1926.  1,611,273
M. L. KELSO
DEVICE FOR CLEANING AUTOMOBILE TOPS
Filed Jan. 5, 1925

INVENTOR.
Mary L. Kelso
BY
ATTORNEY.

Patented Dec. 21, 1926.

1,611,273

UNITED STATES PATENT OFFICE.

MARY L. KELSO, OF LOS ANGELES, CALIFORNIA.

DEVICE FOR CLEANING AUTOMOBILE TOPS.

Application filed January 5, 1925. Serial No. 715.

This invention relates to and has for a main object the provision of means adapted to be supported in operative position in or at the entrance of a garage for the storage of an automobile, and suspended across the path of the automobile for engagement with the top thereof, whereby the dust collected on the top may be removed each time the vehicle is moved thereunder.

Another object is to provide a cleaning member of fabric adapted to be preferably treated with oil or other substances for more readily collecting the dust, and adapted to be suspended edgewise in horizontal position across the entrance to or between the walls of a garage at such an elevation that when an automobile is moved thereunder in either direction the sheet of fabric will drag over the top and remove the dust therefrom.

A further object is to provide means enclosed in seams at the ends of the sheet of fabric for normally supporting the same in vertical position, together with means for adjustably supporting the sheet of fabric in position for use.

Other objects may appear in the following description.

I have shown a preferred embodiment of my invention in the accompanying drawings, in which.

My invention comprises primarily, a substantially rectangular and elongated sheet of fabric F of one or more plys, adapted to be connected at the ends thereof with a pair of cords C, C which extend through eye bolts E, E on opposite sides of the building, and preferably attached to the door beams B, B or the walls of the building, and adjustably held in the lower ends thereof by means of cleats D, D also attached to the members B, B of the building.

The upper and lower edges $e$ and $e'$ are preferably seamed and the ends of the fabric have vertical seams $f$, $f$, in which are held a plurality of metallic buttons $b$, $b$, etc., which serve as weights for holding the cleaning element F normally edgewise across the opening of the building, so that the lower edge of the member F will be slightly below the height of the top T of an automobile A when the same is moved thereunder in either direction.

It is not necessary in the arrangement of the members comprising my invention that the member F be taut, for the weights $b$, $b$, will serve to hold the same edgewise and in position for use, regardless of the elevation thereof, and furthermore the cords C, C, may be adjusted for raising or lowering the member F so that it may be useful for cleaning the tops of automobiles of different height.

Figure 2:
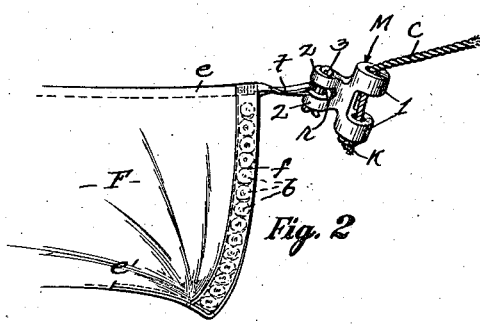
Fig. 2 is a fragmentary perspective view of the cleaning member and one of its connections with the supporting means.

The member F has tapes $t$, $t$, attached to the upper edge $e$ thereof at the ends, which are formed in loops and are sewed to the edges of the fabric, and rings $r$, $r$, as shown in Fig. 2 are held in the loops of said tapes for attachment to members M, M, to which the cords C, C, are attached as shown in Fig. 2.

Members M, M, have lugs 1, 1 which are spaced apart and in axial alinement which are bored to receive the cords C, and said cords are knotted at K below the lowermost of said lugs. Said members also have spaced lugs 2, 2, which are closer together than the lugs 1, 1 and are also diametrically alined and spaced apart for receiving the rings $r$ therebetween. Said rings are held in position by means of an ordinary cotter pin 3, so that the member F is detachably held on the members M, M and the cords C, C are also detachably held thereon. Thus, the member F may be removed from the other members of the device for the purpose of cleaning.

The purpose of the members M, M is to, as far as possible, eliminate the sagging of the member F so that the same will at all times be suspended substantially in a straight horizontal line across the building by reason of the fact that the spaced lugs 1, 1 are sufficiently far apart that the portion of the cords C, C which are extended through said lugs will be almost in a vertical position at all times, and the member F being suspended between the lugs 2, 2 of the members M, M will be more nearly horizontal, regardless of whether or not the device is stretched tightly across the building or not, than otherwise.

Figure 1:
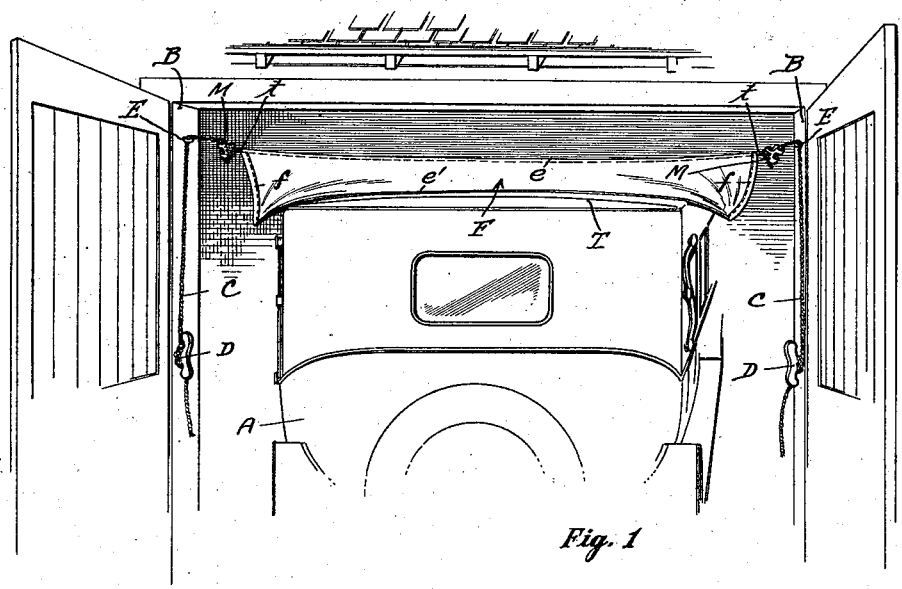
Fig. 1 is a view of my improvements supported in position for use at the entrance of a garage, and also showing an automobile in position under the cleaning member.

Now, in operation, with the member F suspended across the building as shown in Fig. 1, and the cords C, C attached in the usual manner to the cleates C, C on the members B, B of the building, the automobile A may be driven either into or out of the building so that the top T thereof will engage the lower edge e' of the member F. Said lower edge e' of member F being slightly lower than the top T, the cleaning member will be inclined outwardly as the vehicle is moving into the building, or the same will be inclined inwardly if the vehicle is moving out of the building, so that the fabric F will drag over the top T with sufficient tension to lightly scrape and remove any accumulation of dust or dirt therefrom.

When used in the manner shown and described, the dust being removed from the top each time the vehicle is moved into and out of the garage, the top will usually be kept more free and clear of dust than otherwise.

Of course, I may modify my invention within the scope of the appended claims without departing from the spirit thereof.

What I claim is:

1. A device of the character described comprising a sheet of fabric having parallel upper and lower edges adapted to be normally supported in horizontal position at a height sufficient to enable the sheet to wipe the top of a vehicle passing thereunder, of a series of weights held in the ends of the sheet for holding the same in a vertical plane, and means for adjustably supporting said sheet of fabric at selected elevations.

2. A device of the character described including a substantially rectangular sheet of fabric having seams formed at the ends thereof, a series of weights held in said seams for holding said fabric in a vertical plane, and means removably attached to the ends of said fabric for adjustably supporting the same at selected elevations for wiping the top of a vehicle passing thereunder.

3. A device of the character described including a sheet of fabric having weights at the ends thereof for holding the same in a vertical plane, attaching members secured to the upper corners of the sheet at each end, cords adapted to be adjustably secured to the sides of the building and removably secured to said attaching members for suspending said fabric horizontally across the building for wiping the top of a vehicle passing thereunder.

4. In combination with a support, a sheet of fabric, weights in the ends of the sheet, cords connected to the upper corners of said sheet, eyebolts secured in said support through which said cords extend, and cleats on said support around which said cords may be wrapped for adjustably supporting said sheet at a proper elevation for wiping the top of a vehicle passing under the sheet.

MARY L. KELSO.